(12) United States Patent
Goyal et al.

(10) Patent No.: US 11,416,783 B2
(45) Date of Patent: Aug. 16, 2022

(54) SYSTEM AND METHOD FOR VEHICLE ALLOCATION TO USERS

(71) Applicant: ANI Technologies Private Limited, Karnataka (IN)

(72) Inventors: Aditya Narayan Goyal, Karnataka (IN); Karangi Ravi Kanth, Telangana (IN)

(73) Assignee: ANI Technologies Private Limited, Bengaluru (IN)

( * ) Notice: Subject to any disclaimer, the term of this patent is extended or adjusted under 35 U.S.C. 154(b) by 465 days.

(21) Appl. No.: 15/957,516

(22) Filed: Apr. 19, 2018

(65) Prior Publication Data
US 2019/0205795 A1 Jul. 4, 2019

(30) Foreign Application Priority Data

Dec. 29, 2017 (IN) .............................. 201741047186

(51) Int. Cl.
*G06Q 10/02* (2012.01)
*G06Q 10/06* (2012.01)
*G06Q 50/30* (2012.01)

(52) U.S. Cl.
CPC ....... *G06Q 10/02* (2013.01); *G06Q 10/06311* (2013.01); *G06Q 50/30* (2013.01)

(58) Field of Classification Search
CPC .. G06Q 50/30; G06Q 10/02; G06Q 10/06311; G06Q 50/14; G06Q 10/025
See application file for complete search history.

(56) References Cited

U.S. PATENT DOCUMENTS

| | | | |
|---|---|---|---|
| 6,453,298 B2 | 9/2002 | Murakami et al. | |
| 7,848,940 B1 | 12/2010 | Harniman et al. | |
| 2015/0161564 A1* | 6/2015 | Sweeney | G06Q 50/30 |
| | | | 705/338 |
| 2017/0132540 A1* | 5/2017 | Haparnas | G06Q 10/06311 |
| 2017/0147951 A1* | 5/2017 | Meyer | G06Q 10/02 |
| 2017/0213308 A1* | 7/2017 | Wellborn | G01C 21/3453 |
| 2017/0345113 A1* | 11/2017 | Kar | G06Q 30/0267 |
| 2018/0121847 A1* | 5/2018 | Zhao | G06Q 10/06312 |

OTHER PUBLICATIONS

Uber grabs popularity faster, but yet to satisfy many users. (Aug. 21, 2017). The Financial Express Retrieved from https://dialog.proquest.com/professional/docview/1930373567?accountid=131444 (Year: 2017).*
Luis Moreira-Matias et al., "Predicting Taxi-Passenger Demand Using Streaming Data", IEEE Transactions on Intelligent Transportation Systems, vol. 14, No. 3, Sep. 2013, pp. 1393-1402.

* cited by examiner

*Primary Examiner* — Michael P Harrington
(74) *Attorney, Agent, or Firm* — Chip Law Group

(57) ABSTRACT

A method and a system for allocating a vehicle to a user are provided. An availability of a vehicle is detected in a geographical location for an allocation. Based on the historical travel data or a real-time travel-related intention of a set of users in the geographical area, a user is identified from the set of users. A notification message is transmitted to a user device of the identified user based on the detected availability of the vehicle in the geographical area. A user response message is received from the user device in response to the transmitted notification message. Based on the received user response message associated with the selected user, the vehicle is allocated to the selected user for a ride.

16 Claims, 6 Drawing Sheets

SYSTEM AND METHOD FOR VEHICLE ALLOCATION TO USERS

CROSS-RELATED APPLICATIONS

This application claims priority of Indian Application Serial No. 201741047186, filed Dec. 29, 2017, the contents of which are incorporated herein by reference.

FIELD OF THE INVENTION

The present invention relates generally to a vehicle allocation system, and more particularly, to a method and a system for presenting a one-click digital interface for allocating an available vehicle to a user.

BACKGROUND

Generally, passengers avail various public and private transportation services for making trips to and from work places, or when the passengers are engaged in their personal activities. In modern cities, vehicle transit systems play an important role by providing on-demand vehicle services to the passengers to travel to their desired destinations. Although the vehicle transit systems prove to be useful for travelling to the desired destinations at a desired time, going through the same procedures every time for availing the vehicle services to travel to their desired destinations can become quite tedious and cumbersome.

Conventionally, a passenger contacts a vehicle transit system, and requests for a vehicle to travel from a source location to a desired location. Upon confirmation of availability of a vehicle, the vehicle is manually allocated to the passenger. However, the whole process, right from sending the request to the vehicle transit system to being manually allocated the vehicle for a ride, becomes tedious and cumbersome for the passenger who is a frequent user of the service. In such a scenario, the passenger has to always initiate the booking request for the vehicle service well in advance, even for the same route every day. Furthermore, there is no guarantee of the vehicle being allocated to the passenger for the ride, which makes it further inconvenient.

With increased popularity of smart electronic devices, the allocation of the vehicle to the passenger by the vehicle transit system has seen a tremendous improvement. Now-a-days, the vehicle transit system provides an online platform for allocating the vehicle to the passenger. The online platform offers various features, using which the passenger is able to select a type of the vehicle, a type of service, a time of travel, and the like. Based on the information provided by the passenger, an available vehicle is automatically allocated to the passenger. After the allocation, the vehicle transit system provides driver and vehicle details, such as a name of the driver, a driver rating, a contact number of the driver, a vehicle number, or a type of the vehicle, to the passenger by means of the online platform. Similarly, the vehicle transit system provides passenger and booking details, such as a name of the passenger, a pick-up location, or a drop-off location, to the driver by means of the online platform. Though the use of technology has definitely eased out the burden of vehicle allocation, the frequent users of these services have to repeatedly go through the aforementioned procedure for availing the services. Such inconveniences may demotivate the frequent users from using the services of the vehicle transit system.

In light of the foregoing, there exists a need for a technical and more reliable solution that solves the above-mentioned problems and manages the allocation of the vehicle to the passenger in a way that may allow the passenger to book the vehicle in fewer steps, and improves booking experience of the passenger.

SUMMARY

In an embodiment of the present invention, a vehicle allocation method and system for improving booking experience of users are provided. The method includes one or more operations that are executed by circuitry of the system to allocate the vehicles to the users. The circuitry detects an availability of a vehicle in a first geographical area for an allocation. The availability of the vehicle in the first geographical area is detected based on a real-time booking status and real-time position information of the vehicle in the first geographical area. A user is identified from a set of users in the geographical area for a ride based on historical travel data or a real-time travel-related intention of the set of users. The historical travel data of each user from the set of users includes historical pick-up locations of each user associated with the first geographical area, a historical pick-up time associated with each of the historical pick-up locations, and historical drop-off locations of each user associated with at least one of the first geographical area or a second geographical area.

The circuitry transmits a notification message to a user device of the identified user based on the detected availability of the vehicle in the geographical area. The notification message includes at least one of a pick-up or drop-off location of the identified user. The pick-up and drop-off locations of the identified user for the ride are determined based on the historical travel data. The circuitry further receives a user response message from the user device in response to the transmitted notification message. The detected vehicle is allocated to the identified user for the ride based on the received user response message. The circuitry further transmits a confirmation message to the user device of the identified user based on the allocation of the vehicle to the identified user for the ride.

In another embodiment of the present invention, a vehicle allocation method and system for improving booking experience of users are provided. The method includes one or more operations that are executed by circuitry of the system to allocate the vehicles to the users. The circuitry detects an availability of a vehicle in a first geographical area for an allocation. The availability of the vehicle in the first geographical area is detected based on a real-time booking status and real-time position information of the vehicle in the first geographical area. Further, a first subset of users is identified from a set of users in the geographical location based on historical travel data or a real-time travel-related intention of the set of users. The historical travel data of each user from the set of users includes historical pick-up locations of each user associated with the first geographical area, a historical pick-up time associated with each of the historical pick-up locations, and historical drop-off locations of each user associated with at least one of the first geographical area or a second geographical area. Further, pick-up and drop-off locations of each of the first subset of users are determined based on the historical travel data of the first subset of users.

Further, the circuitry transmits notification messages to user devices of the first subset of users based on the detected availability of the vehicle in the geographical area. A notification message transmitted to a user device of a user from the first subset of users includes at least one of the determined pick-up or drop-off location of the user. Further, the circuitry receives user response messages from the user devices of the first subset of users in response to the transmitted notification messages. Further, the circuitry selects a second subset of users from the first subset of users based on user selection parameters. The user selection parameters include a receipt time of each of the user response messages, a user value of each of the first subset of users, or a user rating of each of the first subset of users. Further, the circuitry allocates the detected vehicle to the second subset of users based on the user response messages associated with the second subset of users. The circuitry further transmits a confirmation message to each user of the second subset of users based on the allocated vehicle.

Thus, the methods and the systems of the present invention provide a choice to the passenger to book a ride based on a booking request initiated by a server. The server detects the availability of the vehicle in the geographical area of the passenger, and initiates the booking request. The passenger provides one click input to confirm the booking request for the ride, and the server allocates the detected vehicle to the passenger. Thus, the methods and the systems of the present invention allow the passenger to book the vehicle in fewer steps that consume less time, ensures the allocation of the vehicle to the passenger, and improves the overall booking experience of the passenger.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
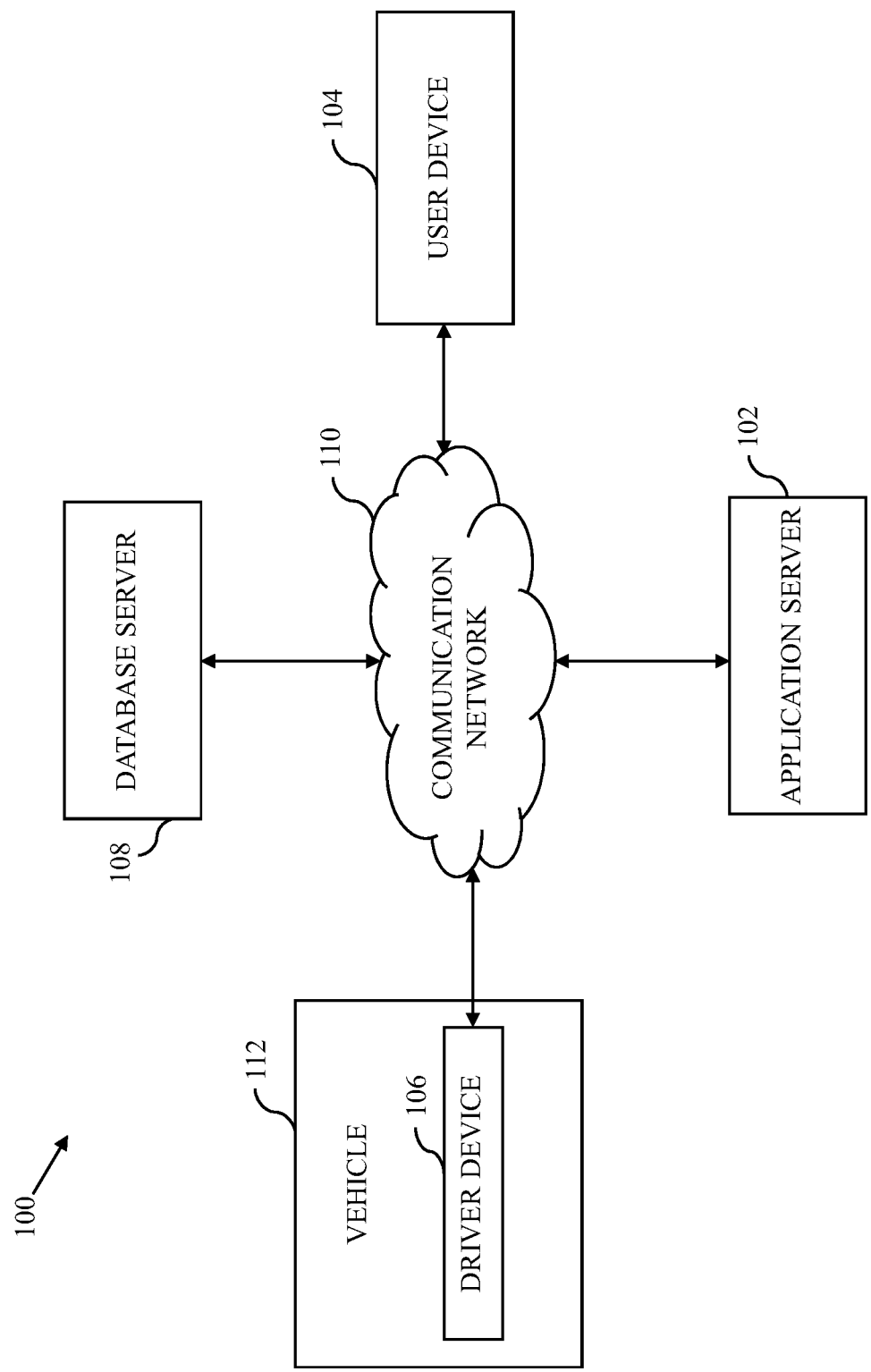
FIG. 1 is a block diagram that illustrates an environment in which various embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for allocating a vehicle available in a geographical area to user(s) of the geographical area by means of one click input by the user(s) in a vehicle transit system. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A vehicle is a means of transport that is deployed by a vehicle transit system, such as a vehicle service provider, to provide vehicle services to users. For example, the vehicle is an automobile, a bus, a car, a bike, or the like. The users may travel in the vehicle to commute between their source and destination locations. Hereinafter, various methods of providing the vehicle services to the users by the vehicle transit system have been described that will become apparent to a person having ordinary skill in the relevant art.

Referring now to FIG. 1, a block diagram that illustrates an environment 100 in which various embodiments of the present invention are practiced. The environment 100 includes an application server 102, a user device 104, a driver device 106, and a database server 108 that communicate with each other by way of a communication network 110. Examples of the communication network 110 include, but are not limited to, a wireless fidelity (Wi-Fi) network, a light fidelity (Li-Fi) network, a satellite network, the Internet, a mobile network such as a cellular data network, a high speed packet access (HSPA) network, or any combination thereof. The driver device 106 is associated with a vehicle 112.

The application server 102 is a computing device, a software framework, or a combination thereof, that may provide a generalized approach to create the application server implementation. In an embodiment, the operation of the application server 102 may be dedicated to execution of procedures, such as, but not limited to, programs, routines, or scripts stored in a memory for supporting its applied applications. In an embodiment, the application server 102 detects an availability of a vehicle, such as the vehicle 112, in a geographical area. The application server 102 identifies a first subset of users from a set of users associated with the geographical area. The application server 102 generates notification messages for the first subset of users. In an exemplary embodiment, a notification message generated for an identified user from the first subset of users includes a booking request initiated by the application server 102 based on the vehicle 112 that is available in the geographical area. The notification message includes at least one of a pick-up or drop-off location of the identified user. The pick-up or drop-off location of the identified user may be determined based on historical travel data of the identified user. After generating the notification messages, the application server 102 transmits the notification messages to user devices, such as the user device 104, of the first subset of users. The application server 102 receives user response messages from the user devices in response to the transmitted notification messages. A user response message provided by the identified user is indicative of a confirmation of the booking request by the identified user.

The application server 102 processes the user response messages, selects a second subset of users from the first subset of users, and allocates the vehicle 112 to the second subset of users. The application server 102 further transmits allocation information to the user devices of the second subset of users. Various operations of the application server 102 have been described in detail in conjunction with FIGS. 2-6. Examples of the application server 102 include, but are not limited to, a personal computer, a laptop, or a network of computer systems. The application server 102 may be realized through various web-based technologies such as, but not limited to, a Java web-framework, a .NET framework, a PHP framework, or any other web-application framework.

The user device 104 is a computing device of a user from the first subset of users that is used by the user to perform one or more activities, such as viewing the notification message. When the user provides an input to open the notification message, a user interface is rendered on the user device 104 by means of a service application installed on the user device 104. The user interface presents the booking request associated with the notification message. The booking request may include the pick-up or drop-off location, a type of the vehicle 112, a ride fare between the pick-up and drop-off locations, or the like. In an exemplary embodiment, the user may modify the drop-off location associated with the booking request. To schedule a ride based on the booking request, the user provides an input to confirm the booking request, and the user device 104 transmits the user response message corresponding to the confirmation of the booking request by the user to the application server 102. The user also uses the user device 104 to view the allocation information, such as vehicle information of the vehicle 112 and driver information of a driver of the vehicle 112, provided by the application server 102. The user may also use the user device 104 to reject the booking request. In another exemplary embodiment, the booking request is automatically rejected by the application server 102, when the user fails to respond to the notification message within a defined time duration, for example, within "10 minutes" of receipt of the notification message by the user device 104. Examples of the user device 104 include, but are not limited to, a personal computer, a laptop, a smartphone, a personal digital assistant (PDA), a tablet, and the like.

The driver device 106 is a computing device that is used by the driver of the vehicle 112 to perform one or more activities, such as viewing a new booking request that is initiated by the application server 102. The driver also uses the driver device 106 to accept or reject the received booking request, to view user information of the user based on the allocation of the vehicle 112 to the user by the application server 102, to view a route between the pick-up and drop-off locations of the booking request allocated by the application server 102 or a third-party server (not shown) over the communication network 110, and so forth. The driver device 106 transmits real-time booking status and real-time position information of the vehicle 112 to the application server 102 over the communication network 110. The real-time booking status may indicate whether the vehicle 112 is currently occupied with an ongoing ride/booking request or is available for the new booking request. The real-time position information may indicate current location information of the vehicle 112. The current location information of the vehicle 112 may be determined based on Global Positioning System (GPS) information detected by location-tracking sensors associated with the driver device 106. In another embodiment, the location-tracking sensors may be separately embedded inside the vehicle 112. In an exemplary embodiment, the driver device 106 may be a vehicle head unit. In another exemplary embodiment, the driver device 106 may be a communication device, such as a smartphone, a personal digital assistant (PDA), a tablet, or any other portable communication device, that is placed in the vehicle 112.

The database server 108 is a data management and storage server that manages and stores the user information of each user in the set of users, the driver information of drivers (such as the driver associated with the vehicle 112), and the vehicle information of vehicles (such as the vehicle 112). The database server 108 includes a processor (not shown) and a memory (not shown) for managing and storing the user, driver, and vehicle information. For example, the user information of the user may include information, such as a user name, a user contact number, a user rating, or other user-related information of the user. The driver information of the driver may include information, such a driver name, a driver contact number, a driver rating, or other driver-related information of the driver. The vehicle information of the vehicle 112 may include information, such as a vehicle type, a vehicle capacity, a vehicle registration number, or other vehicle-related information of the vehicle 112. Further, in an embodiment, the processor manages the historical travel data of each user in the set of users, and stores in the memory. For example, the historical travel data of the user includes historical travel requests by the user, historical booking cancellations by the user, or historical feedback of the user. The historical travel data of the user further includes historical pick-up locations of the user, a historical pick-up time associated with each of the historical pick-up locations, and historical drop-off locations associated with each of the historical pick-up locations. Further, in an embodiment, the database server 108 may receive a query from the application server 102 over the communication network 110 to retrieve the stored information of the user, the driver, or the vehicle 112 associated with the driver. The database server 108, in response to the received query from the application server 102, retrieves and transmits the requested information to the application server 102 over the communication network 110. Examples of the database server 108 include, but are not limited to, a personal computer, a laptop, or a network of computer systems.

Figure 2:
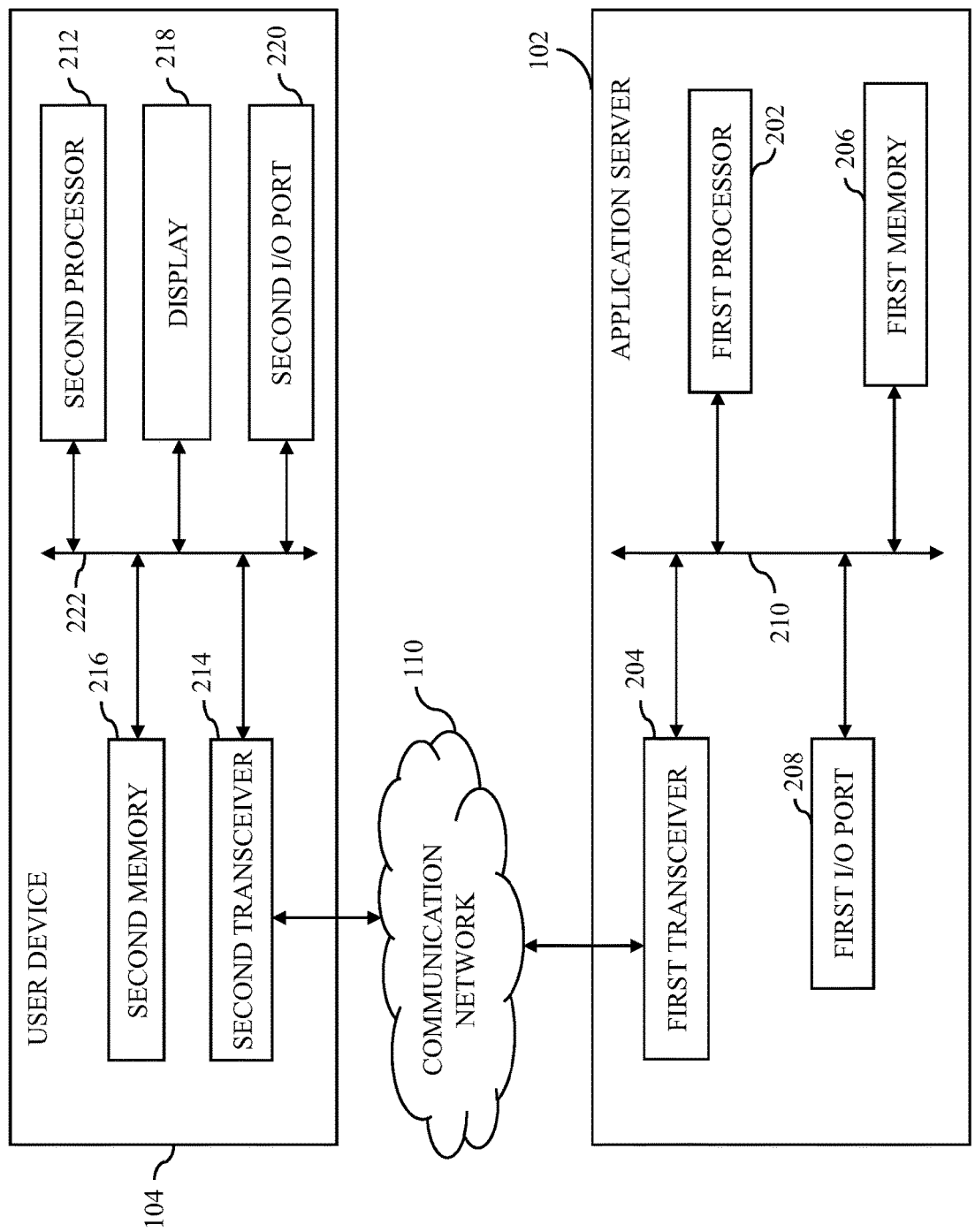
FIG. 2 is a block diagram that illustrates an application server and a user device of the environment of FIG. 1, in accordance with an embodiment of the present invention.

Referring now to FIG. 2, a block diagram that illustrates the application server 102 and the user device 104 of the environment 100 of FIG. 1 is shown, in accordance with an embodiment of the present invention. The application server 102 includes circuitry such as, a first processor 202, a first transceiver 204, a first memory 206, and a first input/output (I/O) port 208 that communicate with each other by way of a first communication bus 210. The user device 104 includes circuitry such as, a second processor 212, a second transceiver 214, a second memory 216, a display 218, and a second I/O port 220 that communicate with each other by way of a second communication bus 222. The user device 104 is associated with a first user from the set of users in the geographical area.

The first processor 202 includes suitable logic, circuitry, and/or interfaces that are operable to execute one or more instructions stored in the first memory 206 to perform one or more operations. The first processor 202 detects the availability of the vehicle 112 in the geographical area. After detecting the availability of the vehicle 112, the first processor 202 identifies the first user from the set of users in the geographical area, who may want to travel from a pick-up location in the geographical area to a drop-off location. The first processor 202 may determine the pick-up and drop-off locations of the first user based on the historical travel data of the first user. The first processor 202 generates and transmits a first notification message to the second transceiver 214 by way of the first transceiver 204 over the communication network 110. The first notification message is the booking request including at least one of the determined pick-up or drop-off location of the first user.

The first processor 202 receives a first user response message in response to the first notification message from the second transceiver 214 by way of the first transceiver 204 over the communication network 110. The first user response message indicates the confirmation of the booking request in the first notification message by the first user. The first processor 202 allocates the vehicle 112 to the first user based on the first user response message. The first processor 202 further generates a first confirmation message including the allocation information of the allocation of the vehicle 112 to the first user, and transmits the first confirmation message to the second transceiver 214 by way of the first transceiver 204 over the communication network 110. Examples of the first processor 202 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the first processor 202 is compatible with multiple operating systems.

The first transceiver 204 includes suitable logic, circuitry, and/or interfaces that are operable to transmit (or receive) data to (or from) various devices, such as the second transceiver 214 over the communication network 110. For example, the first transceiver 204 transmits the first notification message to the second transceiver 214 over the communication network 110. The first transceiver 204 receives the first user response message from the second transceiver 214 over the communication network 110. The first transceiver 204 further transmits the first confirmation message including the allocation information to the second transceiver 214 over the communication network 110. The first transceiver 204 receives the real-time booking status and the real-time position information of the vehicle 112 from the driver device 106 of the vehicle 112 over the communication network 110. The first transceiver 204 further receives the real-time position information of the vehicle 112 from the second transceiver 214 over the communication network 110. Examples of the first transceiver 204 include, but are not limited to, an antenna, a radio frequency transceiver, a wireless transceiver, and a Bluetooth transceiver. The first transceiver 204 communicates with the communication network 110, the first processor 202, and the second transceiver 214 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The first memory 206 includes suitable logic, circuitry, and/or interfaces to store the one or more instructions that are executed by the first processor 202 to perform the one or more operations. Further, the first memory 206 stores the real-time position information and the real-time booking status of the vehicle 112. The first memory 206 further stores the historical travel data of the first user retrieved from the database server 108. The first memory 206 further stores the first notification message, the first user response message, and the first confirmation message including the allocation information corresponding to the first user. Examples of the first memory 206 include, but are not limited to, a random-access memory (RAM), a read-only memory (ROM), a programmable ROM (PROM), and an erasable PROM (EPROM).

The first I/O port 208 includes suitable logic, circuitry, and/or interfaces that are operable to execute one or more instructions stored in the first memory 206 to perform one or more operations. The first I/O port 208 may include various input and output devices that are configured to operate under the control of the first processor 202 by way the first communication bus 210. For example, by means of the first I/O port 208, an administrator associated with the application server 102 may provide one or more inputs to perform the one or more operations. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a universal serial bus (USB) port, an Ethernet port, and the like.

The second processor 212 includes suitable logic, circuitry, and/or interfaces that are operable to execute one or more instructions stored in the second memory 216 to perform one or more operations. For example, the second processor 212 receives the first notification message from the first transceiver 204 by way of the second transceiver 214 over the communication network 110. The second processor 212 may queue the first notification message in a notification section (not shown) that is displayed on the display 218. The second processor 212 receives an input corresponding to the first notification message from the first I/O port 208 provided by the first user. In response to the received input, the second processor 212 renders a first user interface (not shown) on the display 218. The first user interface presents the first notification message including at least one of the determined pick-up or drop-off location of the first user. The first user interface further includes options selectable by the first user.

In an embodiment, in an event of the selection of an option (from the options) by the first user corresponding to the confirmation of the first notification message, the second processor 212 transmits the first user response message to the first transceiver 204 by way of the second transceiver 214 over the communication network 110. The second processor 212 further receives the first confirmation message including the allocation information. The second processor 212 may render a second user interface (not shown) on the display 218. The second user interface presents the allocation information indicating the allocation of the vehicle 112 to the first user. The second user interface may further present an expected pick-up time, an expected drop-off time, ride-sharing details of other users, or the like.

The second processor 212 further captures GPS information of the user device 104 by means of location-tracking sensors (not shown) of the user device 104, and transmits the captured GPS information to the first transceiver 204 over the communication network 110. The second processor 212 further detects real-time travel-related intention of the first user, for example, based on a frequency of usage of the installed application by the first user. Examples of the second processor 212 include, but are not limited to, an ASIC processor, a RISC processor, a CISC processor, or a FPGA. It will be apparent to a person skilled in the art that the second processor 212 is compatible with multiple operating systems. The second processor 212 may operate in accordance with the installed application to perform the one or more operations. It will further be apparent to a person skilled in the art that the second processor 212 may be compatible with multiple displays, for example, the display 218.

The second transceiver 214 includes suitable logic, circuitry, and/or interfaces that are operable to transmit (or receive) data to (or from) various devices, such as the first transceiver 204 over the communication network 110. For example, the second transceiver 214 receives the first notification message from the first transceiver 204 over the communication network 110. The second transceiver 214 transmits the first user response message based on the selected option by the first user to the first transceiver 204 over the communication network 110. The second transceiver 214 further receives the first confirmation message from the first transceiver 204 over the communication network 110, and stores in the second memory 216. The second transceiver 214 transmits the GPS information of the user device 104 to the first transceiver 204 over the communication network 110. The second transceiver 214 further transmits the real-time travel-related intention of the first user to the first transceiver 204 over the communication network 110. Examples of the second transceiver 214 include, but are not limited to, an antenna, a radio frequency transceiver, a wireless transceiver, and a Bluetooth transceiver. The second transceiver 214 communicates with the communication network 110, the second processor 212, and the first transceiver 204 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The second memory 216 includes suitable logic, circuitry, and/or interfaces to store the one or more instructions that are executed by the second processor 212 to perform the one or more operations. Further, the second memory 216 stores the first notification message received from the first transceiver 204. The second memory 216 further stores the first user response message provided by the first user. The second memory 216 further stores the first confirmation message received from the first transceiver 204. The second memory 216 further stores the GPS information of the user device 104 and the real-time travel-related intention of the first user. The second memory 216 further stores the installed application for rendering the user interfaces on the display 218 under the control of the first processor 202. Examples of the second memory 216 include, but are not limited to, a RAM, a ROM, a PROM, and an EPROM.

The display 218 includes suitable logic, circuitry, and/or interfaces that are operable to execute one or more instructions stored in the second memory 216 to perform one or more operations. For example, the display 218 displays the notification section including the first notification message. The display 218 further displays the first or second user interface based on inputs provided by the first user. Examples of the display 218 include, but are not limited to, a Thin-Film-Transistor (TFT) Liquid-Crystal Display (LCD), an In-Plane Switching (IPS) LCD, a Resistive Touchscreen LCD, a Capacitive Touchscreen LCD, an Organic Light Emitting Diode (OLED) display, an Active-Matrix Organic Light-Emitting Diode (AMOLED) display, a Super AMOLED display, a Retina Display, a Haptic/Tactile touchscreen, and a Gorilla Glass.

The second I/O port 220 includes suitable logic, circuitry, and/or interfaces that are operable to execute one or more instructions stored in the second memory 216 to perform one or more operations. The second I/O port 220 may include input and output devices that are configured to operate under the control of the second processor 212 by way of the second communication bus 222. For example, by means of the second I/O port 220, the first user provides the input to select the option from the options presented on the first user interface. Further, the first user may modify the drop-off location presented on the first user interface by means of the second I/O port 220. Examples of the input devices may include a universal serial bus (USB) port, an Ethernet port, a real or virtual keyboard, a mouse, a joystick, a touch screen, a stylus, a microphone, and the like. Examples of the output devices may include the display 218, a speaker, headphones, a USB port, an Ethernet port, and the like.

Figure 3:
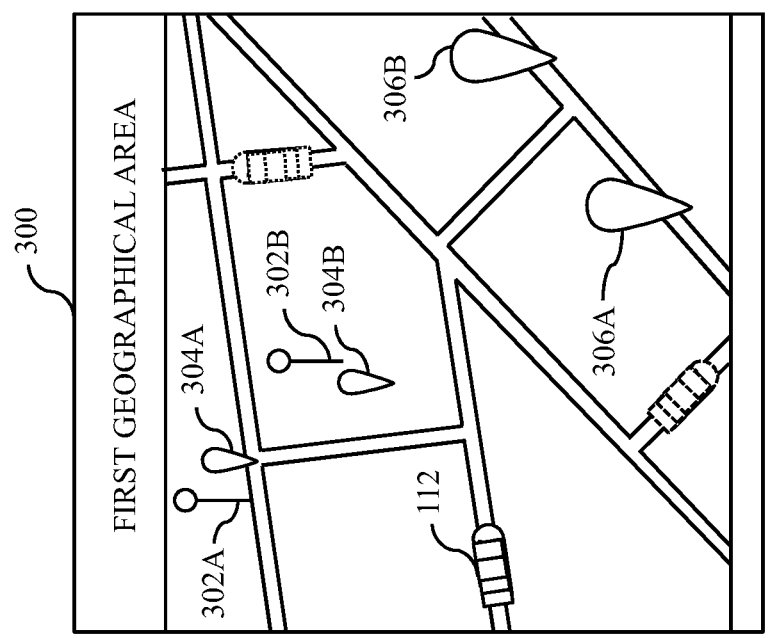
FIG. 3 is an exemplary scenario that illustrates an allocation of a vehicle in a geographical area, in accordance with an embodiment of the present invention.

Referring now to FIG. 3, an exemplary scenario that illustrates the allocation of the vehicle 112 in the geographical area, such as a first geographical area 300, in accordance with an embodiment of the present invention is shown. The first geographical area 300 includes the vehicle 112 that is available for a new allocation. The first geographical area 300 includes the set of users, such as a first user 302A and a second user 302B, a first pick-up location 304A, a second pick-up location 304B, a first drop-off location 306A, and a second drop-off location 306B. The first user 302A is associated with the first pick-up location 304A and the first drop-off location 306A. The second user 302B is associated with the second pick-up location 304B and the second drop-off location 306B.

The first processor 202 determines the first pick-up and drop-off locations 304A and 306A of the first user 302A based on the historical travel data of the first user 302A. For example, based on the historical travel data of the first user 302A, the first processor 202 determines that the first user 302A had traveled to the first drop-off location 306A "9 times" out of "10 rides" taken from the first pick-up location 304A of the first geographical area 300. In such a scenario, the first processor 202 determines the first drop-off location 306A as a possible destination address of the first user 302A. Similarly, the first processor 202 determines the second pick-up and drop-off locations 304B and 306B of the second user 302B based on the historical travel data of the second user 302B. In an embodiment, the first and second drop-off locations 306A and 306B may be associated with the first geographical area 300 or any other geographical area (not shown).

In an embodiment, after detecting the vehicle 112 in the first geographical area 300A, the first processor 202 identifies one of the first and second users 302A and 302B, who may be in a need for the ride. For example, the first user 302A may require a vehicle service to travel between the first pick-up and drop-off locations 304A and 306A, or the second user 302B may require a vehicle service to travel between the second pick-up and drop-off locations 304B and 306B. In an embodiment, the first processor 202 may identify one of the first and second users 302A and 302B based on the historical travel data of the first and second users 302A and 302B. For example, the first processor 202 determines a first user value of the first user 302A based on at least one of a first count of historical trips taken by the first user 302A or a first gross revenue generated due to the first count of historical trips taken by the first user 302A. Similarly, the first processor 202 determines a second user value of the second user 302B based on at least one of a second count of historical trips taken by the second user 302B or a second gross revenue generated due to the second count of historical trips taken by the second user 302B. Further, the first processor 202 may determine a reliability score of each of the first and second users 302A and 302B based on at least one of a count of booking cancellation made by each of the first and second users 302A and 302B in the past or a user rating associated with each of the first and second users 302A and 302B. Based on the first and second user values and reliability scores of the first and second users 302A and 302B, the first processor 202 may identify one of the first and second users 302A and 302B. In another embodiment, the first processor 202 may identify one of the first and second users 302A and 302B based on the real-time travel-related intention detected for each of the first and second users 302A and 302B. The real-time travel-related intention may be detected by the first processor 202 based on a usage frequency of the installed application by the first and second users 302A and 302B.

With respect to the ongoing exemplary scenario, based on at least one of the first user value, the reliability score, or the real-time travel-related intention of the first user 302A in comparison to at least one of the second user value, the reliability score, or the real-time travel-related intention of the second user 302B, the first processor 202 determines that a probability of taking the ride by the first user 302A is more than the second user 302B. In such a scenario, the first processor 202 identifies the first user 302A over the second user 302B. Further, in an embodiment, the first processor 202 transmits the first notification message to a first user device, such as the user device 104, of the first user 302A. The second transceiver 214 of the user device 104 of the first user 302A receives the first notification message, and stores in the second memory 216. The first user 302A provides the input by means of the second I/O port 220 to view the first notification message. In response to the input, the second processor 212 renders the first user interface on the display 218. The first user interface includes the booking request generated by the first processor 202 based on the vehicle 112 in the first geographical area 300, and presents the first pick-up and drop-off locations 304A and 306A of the first user 302A.

In an embodiment, the first user interface further includes the option selectable by the first user 302A for confirming the booking request of the first notification message. When the option is selected by the first user 302A, the second processor 212 transmits the first user response message to the first transceiver 204 by way of the second transceiver 214. The first processor 202 allocates the vehicle 112 to the first user 302A based on the first user response message. After the allocation, the first processor 202 may transmit the first confirmation message including the allocation information of the vehicle 112 to the first user 302A. In one embodiment, when the first processor 202 does not receive the first user response message from the user device 104 of the first user 302A within a preset time interval, the first processor 202 may not consider the first user 302A for the allocation. In such a scenario, the first processor 202 may transmit the second notification message to the user device 104 of the second user 302B, and the same process is repeated as described above for the second user 302A.

In another embodiment, the first processor 202 may transmit the first and second notification messages to the user devices of the first and second users 302A and 302B, simultaneously. Thereafter, based on a receipt time associated with each of the first and second user response messages, the first processor 202 may select one of the first and second users 302A and 302B. For example, if the first user response message is received before the second user response message, then the first processor 202 may allocate the vehicle 112 to the first user 302A, or vice-versa. In another embodiment, after receiving the first and second user response messages, the first processor 202 determines that the first user value or reliability score of the first user 302A is greater than the second user value or reliability score the second user 302B, then the first processor 202 may allocate the vehicle 112 to the first user 302A, or vice-versa.

In another embodiment, in an event of a ride-sharing system where users of the set of users may want to share their rides with other users, the first processor 202 may identify the first subset of users, such as the first and second users 302A and 302B, from the set of users in the first geographical area 300. The first processor 202 generates and transmits the first and second notification messages to the user devices of the first and second users 302A and 302B, simultaneously. Thereafter, the first processor 202 receives the first and second user response messages from the user devices of the first and second users 302A and 302B. The first processor 202 may select the second subset of users from the first and second users 302A and 302B for the ride-sharing based on selection parameters. The selection parameters include at least one of the receipt time of each of the first and second user response messages, the first and second user values of the first and second users 302A and 302B, the user rating of each of the first and second users 302A and 302B, or a user preference of each of the first and second users 302A and 302B corresponding to the ride-sharing. The selection parameters further include a route matching parameter for matching routes between the pick-up and drop-off locations of the first subset of users. For example, a first route between the first pick-up and drop-off locations 304A and 306A of the first user 302A may be matched with a second route between the second pick-up and drop-off locations 304B and 306B of the second user 302B, and if the first and second routes match, for example, the first and second routes are along the same direction or along the same drop-off location, then the first processor 202 may select the first and second users 302A and 302B as the second subset of users. After selecting the second subset of users, the first processor 202 allocates the vehicle 112 to the selected second subset of users for their rides corresponding to their drop-off locations.

Figure 4:
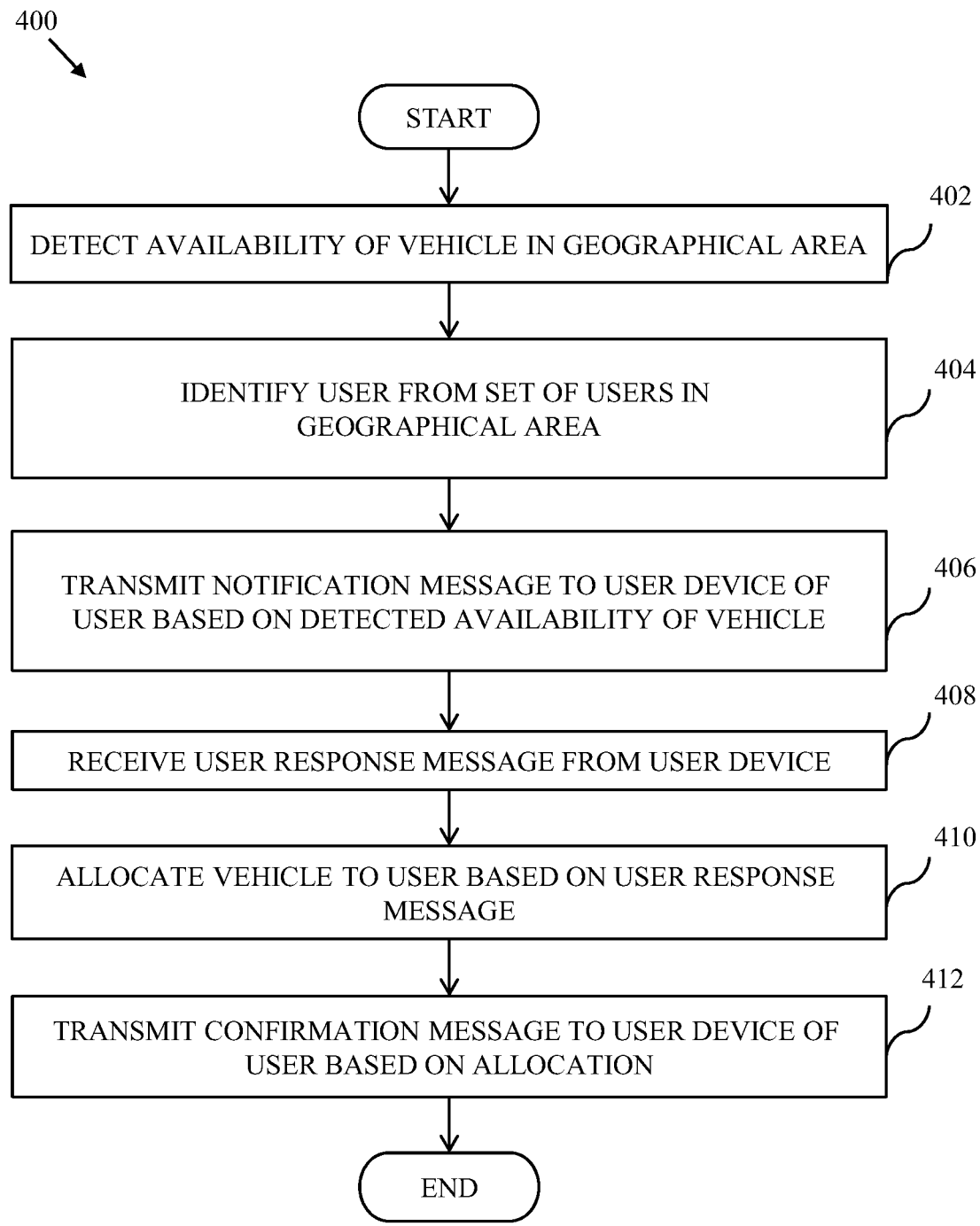
FIG. 4 is a flow chart that illustrates a method for allocating a vehicle to a user, in accordance with an embodiment of the present invention.

Referring now to FIG. 4, a flow chart 400 that illustrates a method for allocating the vehicle 112 to the first user 302A is shown, in accordance with an embodiment of the present invention.

At step 402, the availability of the vehicle 112 is detected in the geographical area, such as the first geographical area 300. The first processor 202 retrieves the real-time booking status and the real-time position information of the vehicle 112. In one embodiment, the first processor 202 retrieves the real-time booking status and the real-time position information of the vehicle 112 from the driver device 106 of the vehicle 112. In another embodiment, the first processor 202 retrieves the real-time booking status and the real-time position information of the vehicle 112 from the database server 108. The first processor 202 detects the availability of the vehicle 112 in the first geographical area 300 based on the retrieved real-time booking status and the real-time position information of the vehicle 112. For example, when the real-time booking status of the vehicle 112 indicates that the vehicle 112 is available for the new allocation, and the real-time position information of the vehicle 112 indicates that the vehicle 112 is in the first geographical area 300, then the first processor 202 may detect the vehicle 112 to be available for the allocation corresponding to the new booking request.

At step 404, the first user 302A is identified from the set of users in the first geographical area 300. The first processor 202 identifies the first user 302A based on the historical travel data of the set of users. For example, the vehicle 112 is detected for the new allocation in the first geographical area 300 at a time instance of "09:50 AM". Based on the historical travel data of the set of users, the first processor 202 identifies the first user 302A from the set of users, who wants to travel from the pick-up location in the first geographical area 300 at a pick-up time (i.e., by "10:00 AM") that is within a defined threshold of the time instance, such as within "10 minutes" of the time instance "09:50 AM". In another embodiment, the first processor 202 identifies the first user 302A from the set of users based on the real-time travel-related intention of the first user 302A. For example, if the first user 302A has opened the installed application on the user device 104 for at least a defined number of times, for example, "5 times" but has not booked the ride yet, then the first processor 202 identifies the first user 302A from the set of users.

At step 406, the first notification message is transmitted to the user device 104 of the first user 302A. The first processor 202 transmits the first notification message based on the detected availability of the vehicle 112 in the first geographical area 300. The first notification message may include the booking request including at least one of the first pick-up or drop-off location 304A or 306A of the first user 302A, the ride fare between the first pick-up and drop-off locations 304A and 306A, or the vehicle type of the vehicle 112.

At step 408, the first user response message is received. Based on the option corresponding to the confirmation of the first notification message selected by the first user 302A on the first user interface, the second transceiver 214 transmits the first user response message to the first transceiver 204 over the communication network 110 under the control of the second processor 212. The first transceiver 204 receives the first user response message, and stores in the first memory 206.

At step 410, the first processor 202 allocates the vehicle 112 to the first user 302A based on the first user response message. The first processor 202 processes the first user response message, and determines the confirmation of the booking request by the first user 302A. Based on the confirmation, the first processor 202 allocates the vehicle 112 to the first user 302A.

At step 412, the first processor 202 transmits the confirmation message including the allocation information to the second transceiver 214 by way of the first transceiver 204 over the communication network 110. The second transceiver 214 receives the confirmation message, and stores in the second memory 216. The first user 302A may provide the input to view the confirmation message. In response to the input provided by the first user 302A, the second processor 212 renders the second user interface on the display 218, and presents the allocation information associated with the confirmation message. The allocation information includes the driver and vehicle information, such as driver details, type of vehicle services, a travel time, a time of arrival of the vehicle 112, or the like.

Figure 5:
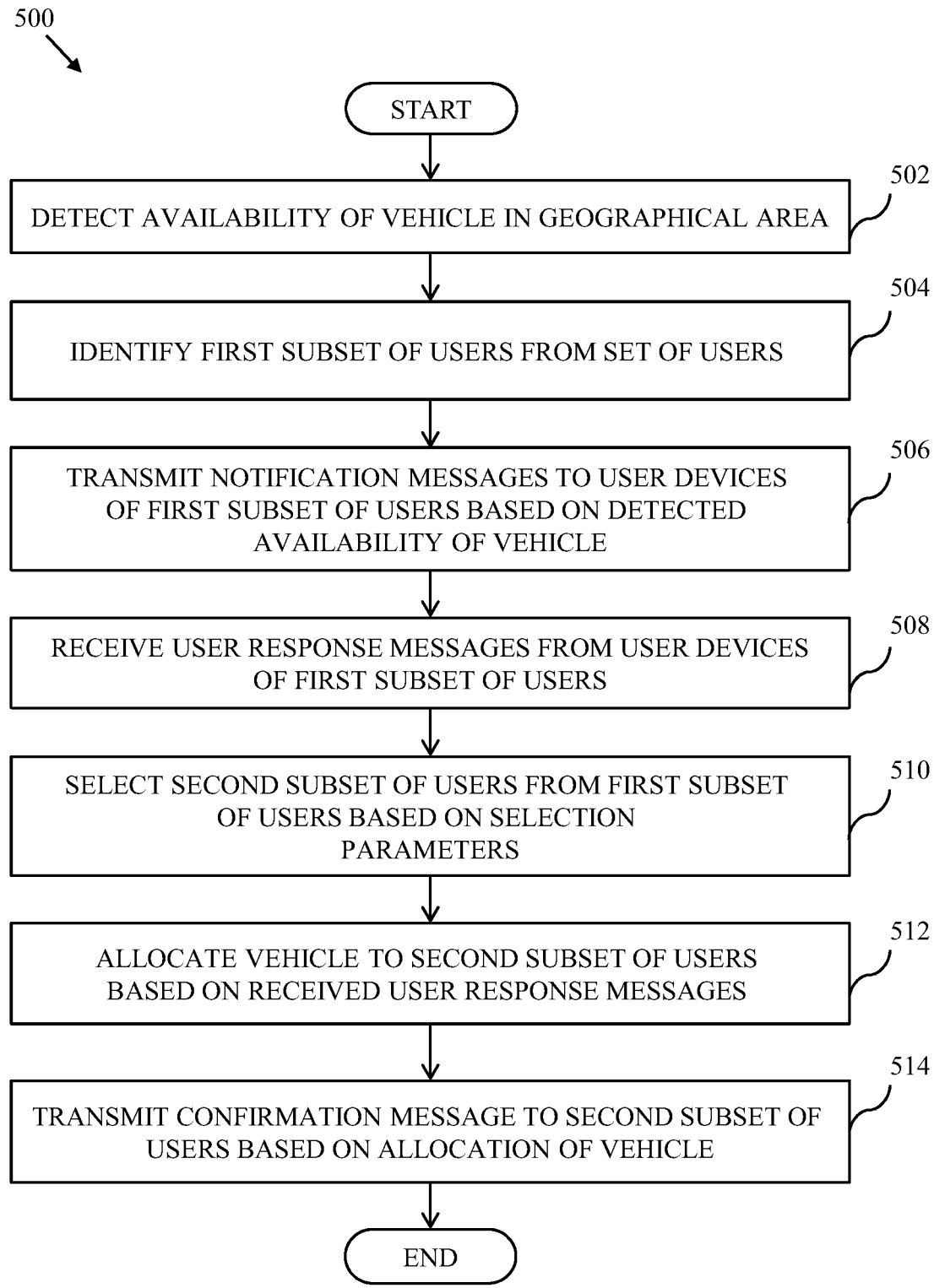
FIG. 5 is a flow chart that illustrates a method for allocating a vehicle to users in a ride-sharing system, in accordance with another embodiment of the present invention.

Referring now to FIG. 5, a flow chart 500 that illustrates a method for allocating the vehicle 112 to the second subset of users is shown, in accordance with another embodiment of the present invention.

At step 502, the availability of the vehicle 112 is detected in the geographical area, such as the first geographical area 300. The first processor 202 retrieves the real-time booking status and the real-time position information of the vehicle 112. In one embodiment, the first processor 202 retrieves the real-time booking status and the real-time position information of the vehicle 112 from the driver device 106 of the vehicle 112. In another embodiment, the first processor 202 retrieves the real-time booking status and the real-time position information of the vehicle 112 from the database server 108. The first processor 202 detects the availability of the vehicle 112 in the first geographical area 300 based on the retrieved real-time booking status and the real-time position information of the vehicle 112. For example, when the real-time booking status of the vehicle 112 indicates that the vehicle 112 is available for the new allocation, and the real-time position information of the vehicle 112 indicates that the vehicle 112 is in the first geographical area 300, then the first processor 202 may detect the vehicle 112 to be available for the allocation corresponding to the new booking request.

At step 504, the first subset of users, such as the first and second users 302A and 302B, are identified from the set of users in the first geographical area 300. The first processor 202 identifies the first subset of users based on the historical travel data of the set of users. For example, the vehicle 112 is detected for the new allocation in the first geographical area 300 at a time instance of "17:50 PM". Based on the historical travel data of the set of users, the first processor 202 identifies the first subset of users from the set of users, who may want to travel from their pick-up locations in the first geographical area 300 at pick-up times that are within defined thresholds of the time instance, such as within "10 minutes" of the time instance "17:50 PM"). For example, the first processor 202 identifies that the first user 302A may want to travel from the pick-up location in the first geographical area 300 at the pick-up time of "18:00 PM". Further, the first processor 202 identifies that the second user 302B may want to travel from the pick-up location in the first geographical area 300 at the pick-up time of "18:05 PM". In such a scenario, the first processor 202 may identify the first and second users 302A and 302B as the first subset of users. In another embodiment, the first processor 202 identifies the first subset of users based on the real-time travel-related intention of the first subset of users. For example, if the first and second users 302A and 302B have opened the installed application on their respective user devices (such as the user device 104) for at least a defined number of times, for example, "5 times" and "6 times", respectively, but have bot booked the rides yet, then the first processor 202 may identify the first and second users 302A and 302B as the first subset of users.

At step 506, the notification messages are transmitted to the user devices of the first subset of users. The first processor 202 transmits the notification messages based on the detected availability of the vehicle 112 in the first geographical area 300. Each of the notification messages may include the booking request including at least one of the pick-up or drop-off location of the user from the first subset of users, the ride fare between the first pick-up and drop-off locations, or the vehicle type of the vehicle 112.

At step 508, the user response messages are received. The user response messages indicates the confirmation of the booking requests associated with the notification messages. The first transceiver 204 receives the user response messages from the user devices of the first subset of users, and stores in the first memory 206.

At step 510, the second subset of users are selected from the first subset of users. The first processor 202 selects the second subset of users from the first subset of users based on the selection parameters. The selection parameters include at least one of the receipt time of each of the user response messages, the user value of each of the first subset of users, the user rating of each of the first subset of users, or the user preference corresponding to the services, such single-sharing or multiple-sharing vehicle services.

At step 512, the first processor 202 allocates the vehicle 112 to the second subset of users. The first processor 202 processes the user response messages of the second subset of users, and determines the confirmation of the booking requests by the second subset of users. Based on the confirmation by the second subset of users, the first processor 202 allocates the vehicle 112 to the second subset of users. For example, the first processor 202 allocates the vehicle 112 to the second subset of users, when the determined preference indicates the acceptance of the booking request by the second subset of users for the ride-sharing system, where each user of the second subset of users may want to share their other users.

At step 514, the first processor 202 transmits confirmation messages including the allocation information to the user devices of the second subset of users. The allocation information includes the driver and vehicle information, such as driver details, type of vehicle services, a travel time, to time of arrival of the vehicle 112, or the like.

Figure 6:
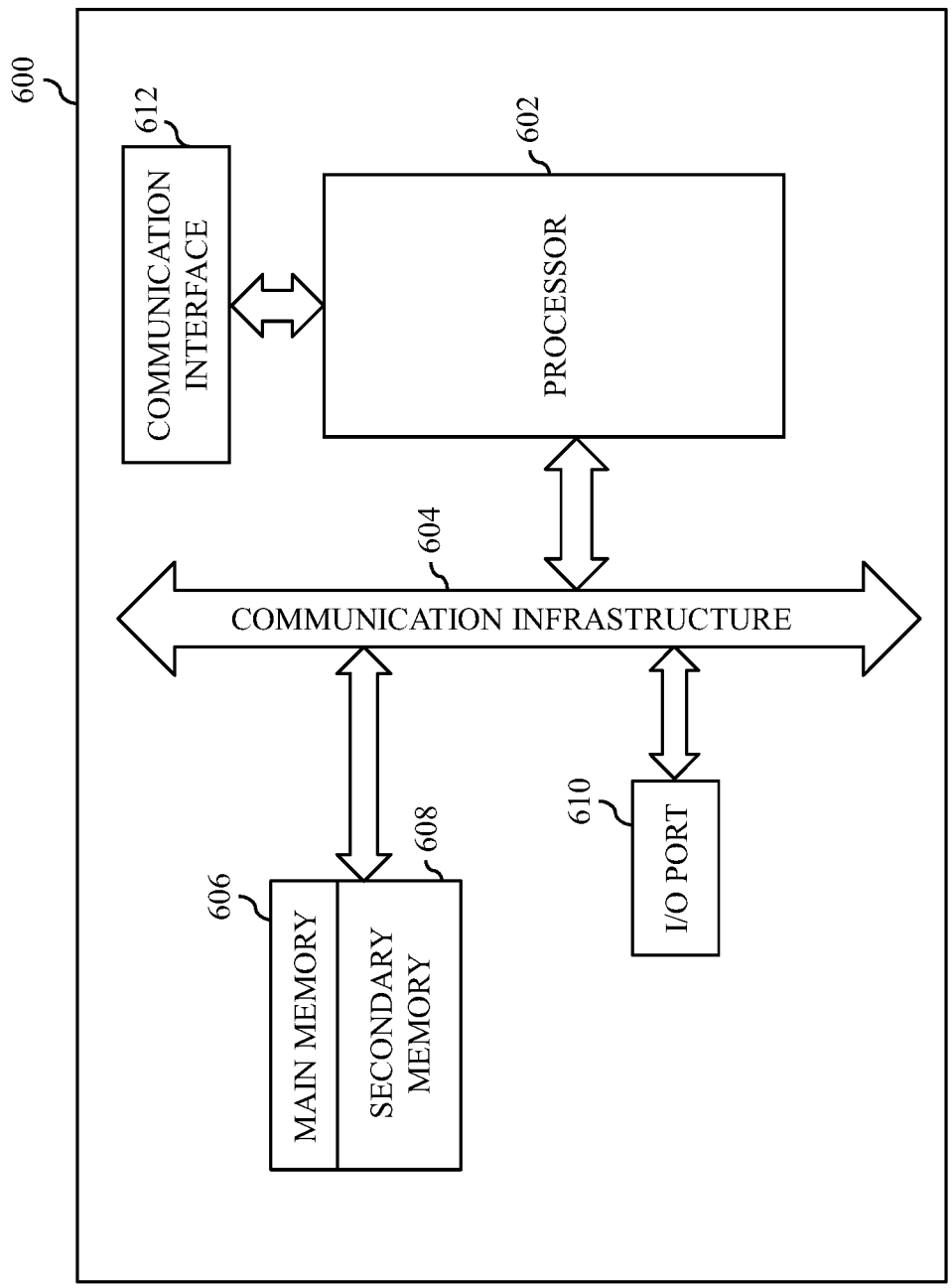
FIG. 6 is a block diagram that illustrates a computer system for allocating a vehicle, in accordance with an embodiment of the present invention.

Referring now to FIG. 6, a block diagram that illustrates a computer system 600 for allocating the vehicle 112 to one or more users is shown, in accordance with an embodiment of the present invention. An embodiment of the present invention, or portions thereof, may be implemented as computer readable code on the computer system 600. In one example, the application server 102 and the database server 108 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 5.

The computer system 600 includes a processor 602 that may be a special purpose or a general purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, the communication network 110, multi-core message-passing scheme, and the like. The computer system 600 further includes a main memory 606 and a secondary memory 608. Examples of the main memory 606 may include RAM, ROM, and the like. The secondary memory 608 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 600 further includes an I/O port 610 and a communication interface 612. The I/O port 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communications port, and the like. Data transferred via the communication interface 612 may be signals, such as electronic, electromagnetic, optical, or other signals as will be apparent to a person skilled in the art. The signals may travel via a communications channel, such as the communication network 110 which may be configured to transmit the signals to the various devices that are communicatively coupled to the computer system 600. Examples of the communication channel may include, but are not limited to, cable, fiber optics, a phone line, a cellular phone link, a radio frequency link, a wireless link, and the like.

Computer program medium and computer usable medium may refer to memories, such as the main memory 606 and the secondary memory 608, which may be a semiconductor memory such as dynamic RAMs. These computer program mediums may provide data that enables the computer system 600 to implement the methods illustrated in FIGS. 4 and 5. In an embodiment, the present invention is implemented using a computer implemented application. The computer implemented application may be stored in a computer program product and loaded into the computer system 600 using the removable storage drive or the hard disc drive in the secondary memory 608, the I/O port 610, or the communication interface 612.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor, such as the processor 602, and a memory, such as the main memory 606 and the secondary memory 608, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present invention provide, among other features, systems and methods for allocating the vehicle to the one or more users. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A vehicle allocation method, comprising:
    detecting, by a processor, an availability of a vehicle in a first geographical area for an allocation based on real-time position information of the vehicle;
    detecting, by the processor, a number of times an installed application is opened on each of a set of user devices of a set of users in the first geographical area;
    identifying, by the processor, a user from the set of users in the first geographical area for a ride on the available vehicle based on a real-time travel-related intention of the user in the set of users, wherein the real-time travel-related intention of the user is identified based on detecting that the installed application is opened on a user device of the user for at least a defined number of times and ride is not booked yet;
    determining, by the processor, a pick-up location and a drop-off location of the identified user based on historical travel data of the identified user;
    initiating, by the processor, a booking request that includes the determined pick-up location and the determined drop-off location for the identified user based on the detected availability of the vehicle in the first geographical area;
    transmitting, by the processor via a communication network, the booking request including the determined pick-up location and the determined drop-off location to the user device of the identified user;
    receiving, by the processor via the communication network, a first confirmation message from the user device based on the determined pick-up location and the determined drop-off location included in the transmitted booking request, wherein the first confirmation message indicates confirmation of the booking request for the ride by the identified user; and
    allocating, by the processor, the vehicle to the identified user for the ride based on the received first confirmation message.

2. The vehicle allocation method of claim 1, wherein the availability of the vehicle in the first geographical area is further detected based on a real-time booking status of the vehicle in the first geographical area.

3. The vehicle allocation method of claim 1, wherein the historical travel data of the user comprises at least one or more historical pick-up locations of the user associated with the first geographical area, a historical pick-up time associated with each of the one or more historical pick-up locations, and one or more historical drop-off locations of the user associated with at least one of the first geographical area or a second geographical area.

4. The vehicle allocation method of claim 1, further comprising transmitting, by the processor, a second confirmation message to the user device of the identified user based on the allocation of the vehicle to the identified user for the ride.

5. The vehicle allocation method of claim 1, further comprising allowing, by the processor via the communication network, the identified user to modify at least one of the determined pick-up location or the determined drop-off location associated with the booking request.

6. The vehicle allocation method of claim 1, further comprising receiving, by the processor from a driver device associated with the vehicle, the real-time position information of the vehicle, wherein the real-time position information indicates a current location of the vehicle, and wherein the current location is detected by one or more location-tracking sensors of the driver device.

7. A vehicle allocation system, comprising:
    a processor configured to:
        detect an availability of a vehicle in a first geographical area for an allocation based on real-time position information of the vehicle;
        detect a number of times an installed application is opened on each of a set of user devices of a set of users in the first geographical area;
        identify a user from the set of users in the first geographical area for a ride on the available vehicle based on a real-time travel-related intention of the user in the set of users, wherein the real-time travel-related intention of the user is identified based on detecting that the installed application is opened on a user device of the user for at least a defined number of times and ride is not booked yet;
        determine a pick-up location and a drop-off location of the identified user based on historical travel data of the identified user;
        initiate a booking request that includes the determined pick-up location and the determined drop-off location for the identified user based on the detected availability of the vehicle in the first geographical area;
        transmit, via a communication network, the booking request that includes the determined pick-up location and the determined drop-off location to the user device of the identified user;
        receive, via the communication network, a first confirmation message from the user device based on the determined pick-up location and the determined drop-off location included in the transmitted booking request, wherein the first confirmation message indicates confirmation of the booking request for the ride by the identified user; and
        allocate the vehicle to the identified user for the ride based on the received first confirmation message.

8. The vehicle allocation system of claim 7, wherein the availability of the vehicle in the first geographical area is further detected based on a real-time booking status of the vehicle in the first geographical area.

9. The vehicle allocation system of claim 7, wherein the historical travel data of the user comprises at least one or more historical pick-up locations of the user associated with the first geographical area, a historical pick-up time associated with each of the one or more historical pick-up locations, and one or more historical drop-off locations of the user associated with at least one of the first geographical area or a second geographical area.

10. The vehicle allocation system of claim 7, wherein the processor is further configured to transmit a second confirmation message to the user device of the identified user based on the allocation of the vehicle to the identified user for the ride.

11. The vehicle allocation system of claim 7, wherein the processor is further configured to allow, via the communication network, the identified user to modify at least one of the determined pick-up location or the determined drop-off location associated with the booking request.

12. A vehicle allocation method, comprising:
  detecting, by a processor, an availability of a vehicle in a first geographical area for an allocation based on real-time position information of the vehicle;
  detecting, by the processor, a number of times an installed application is opened on each of a set of user devices of a set of users in the first geographical area;
  identifying, by the processor, a plurality of users from the set of users in the first geographical area for a ride on the available vehicle based on a real-time travel-related intention of the plurality of users in the set of users, wherein the real-time travel-related intention of the plurality of users is identified based on detecting that the installed application is opened on a plurality user devices of the plurality of users for at least a defined number of times and rides are not booked yet;
  determining, by the processor, a pick-up location and a drop-off location of each of the identified plurality of users for the ride based on historical travel data of each of the identified plurality of users;
  initiating, by the processor, a plurality of booking requests for the identified plurality of users based on the detected availability of the vehicle in the first geographical area, wherein each of the plurality of booking requests includes the determined pick-up location and the determined drop-off location of each of the corresponding plurality of users;
  transmitting, by the processor via a communication network, the plurality of booking requests each including the corresponding pick-up location and the corresponding drop-off location to the plurality of user devices of the identified plurality of users;
  receiving, by the processor via the communication network, a plurality of user response messages from the plurality of user devices in response to the transmitted plurality of booking requests;
  selecting, by the processor, one or more users from the identified plurality of users based on one or more selection parameters; and
  allocating, by the processor, the vehicle to the selected one or more users for the ride based on one or more user response messages associated with the selected one or more users.

13. The vehicle allocation method of claim 12, wherein the availability of the vehicle in the first geographical area is further detected based on a real-time booking status of the vehicle in the first geographical area.

14. The vehicle allocation method of claim 12, wherein the one or more selection parameters comprise at least one of a receipt time of each of the received plurality of user response messages, a user value of each of the identified plurality of users, a user rating of each of the identified plurality of users, or a user preference of each of the identified plurality of users corresponding to a ride-sharing vehicle service.

15. The vehicle allocation method of claim 12, wherein the historical travel data of each user comprises at least one or more historical pick-up locations of each user associated with the first geographical area, a historical pick-up time associated with each of the one or more historical pick-up locations, and one or more historical drop-off locations of each user associated with at least one of the first geographical area or a second geographical area.

16. The vehicle allocation method of claim 12, further comprising transmitting, by the processor, a confirmation message to the selected one or more users based on the allocation of the vehicle to the selected one or more users for the ride.

* * * * *